United States Patent Office 3,816,431
Patented June 11, 1974

3,816,431
BROMINE OR CHLORINE CONTAINING QUINOPHTHALONE PIGMENT
Kenzo Konishi, Nishinomiya, Teijiro Kitao, Tondabayashi, Masaru Matsuoka, and Hisayoshi Shiozaki, Sakai, Japan, assignors to Mitsubishi Chemical Industries Ltd., Tokyo, Japan
No Drawing. Filed Mar. 28, 1972, Ser. No. 238,957
Claims priority, application Japan, Aug. 21, 1971, 46/63,630
Int. Cl. C07d 33/36
U.S. Cl. 260—289 QP                  4 Claims

ABSTRACT OF THE DISCLOSURE

A pigment having the formula:

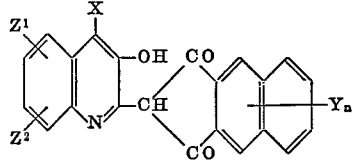

wherein
X represents hydrogen or halogen,
Y represents halogen,
$Z^1$ represents hydrogen, halogen, lower alkyl or lower alkoxy,
$Z^2$ represents hydrogen or halogen, and
n represents an integer of 1–4,
can be prepared by reacting a quinoline derivative having the formula:

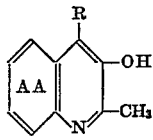

wherein R represents hydrogen, carboxyl or halogen, and wherein the benzene ring A may be substituted with halogen, lower alkyl, or lower alkoxy with a halogenated naphthalene-2,3-dicarboxylic acid having the formula:

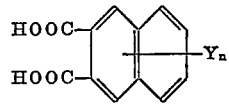

wherein Y represents halogen, and n represents an integer of 1–4; or the corresponding anhydrides or imides thereof; in one embodiment, the product is further halogenated.

BACKGROUND OF THE INVENTION

Field Of The Invention

This invention relates to a novel quinophthalone type pigment and to a process for preparing same. More particularly, this invention relates to a process for preparing an organo pigment characterized by excellent fastness to light, good heat resistance, good oil resistance, good chemical resistance, and high tinting strength, which can provide clear yellow tones to paints, printing inks and various resins.

Description Of The Prior Art

Although it has heretofore been known that oil soluble pigments of Quinone Yellow can be prepared from quinophthalones, the known pigments prepared in this manner have generally been characterized by poor light fastness, low heat resistance and low oil resistance. Accordingly, these types of pigments have found quite limited application.

SUMMARY OF THE INVENTION

Accordingly, it is one object of this invention to provide a novel quinophthalone type pigment characterized by excellent light fastness, good heat resistance, good oil resistance, good chemical resistance and high tinting strength, which is suitable for coloring pigments, printing inks and plastics.

It is another object of this invention to provide an industrially attractive process for preparing a novel quinophthalone type pigment having excellent light fastness, good heat resistance, good oil resistance, good chemical resistance and high tinting strength.

The novel pigments of this invention have the formula:

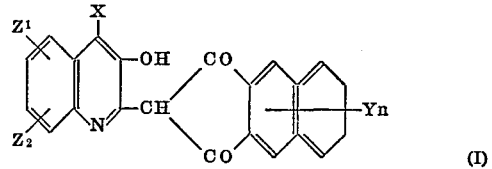

wherein
X represents hydrogen or halogen,
Y represents halogen,
$Z^1$ represents hydrogen, halogen, lower alkyl or lower alkoxy (1–4 carbon atoms)
$Z^2$ represents hydrogen or halogen, and
n represents an integer of 1–4.

The novel pigment can be prepared by reacting with heating, a quinoline derivative having the formula:

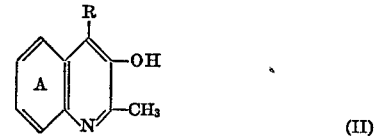

wherein R represents hydrogen, carboxyl, or halogen, and the benzene ring A may be substituted with halogen, lower alkyl, or lower alkoxy, with a halogenated naphthalene-2,3-dicarboxylic acid having the formula:

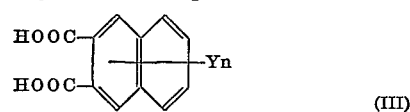

wherein Y represents halogen, and n represents an integer of 1–4; or an anhydride or imide thereof. In one embodiment, the product is further halogenated.

DETAILED DESCRIPTION OF THE PREFERRED EMBODIMENTS

Suitable quinoline derivatives having the formula (II) which may be used as the starting material include:

2-methyl-3-oxyquinoline,
2-methyl-3-oxyquinoline-4-carboxylic acid,
2-methyl-3-oxy-4-chloroquinoline,
2-methyl-3-oxy-4-bromoquinoline,
2-methyl-3-oxy-6-chloroquinoline,
2-methyl-3-oxy-6-bromoquinoline,
2-methyl-3-oxy-8-chloroquinoline,
2-methyl-3-oxy-8-bromoquinoline,
2-methyl-3-oxy-4,6-dibromoquinoline,
2-methyl-3-oxy-4-bromo-6-chloroquinoline,
2-methyl-3-oxy-6,8-dichloroquinoline,
2-methyl-3-oxy-6,7-dichloroquinoline,
2-methyl-3-oxy-5,6-dichloroquinoline,
2-methyl-3-oxy-4-bromo-6-methylquinoline,
2-methyl-3-oxy-4-bromo-6-ethylquinoline,
2-methyl-3-oxy-4-bromo-6-methoxyquinoline,
2-methyl-3-oxy-4-bromo-6-ethoxyquinoline,
2-methyl-3-oxy-4-chloro-6-methylquinoline, 2-methyl-3-oxy-4-chloro-6-ethylquinoline,
2-methyl-3-oxy-4-chloro-6-methoxyquinoline,
2-methyl-3-oxy-4-chloro-6-ethoxyquinoline,
2-methyl-3-oxy-4,8-dibromo-6-methylquinoline,
2-methyl-3-oxy-4,8-dibromo-6-ethylquinoline,
2-methyl-3-oxy-4,8-dibromo-6-methoxyquinoline,
2-methyl-3-oxy-4,8-dibromo-6-ethoxyquinoline,
2-methyl-3-oxy-4,8-dichloro-6-methylquinoline,
2-methyl-3-oxy-4,8-dichloro-6-ethylquinoline,
2-methyl-3-oxy-4,8-dichloro-6-methoxyquinoline,
2-methyl-3-oxy-4,8-dichloro-6-ethoxyquinoline,
2-methyl-3-oxy-4,5 (or 4,7)-dibromo-6-methylquinoline,
2-methyl-3-oxy-4,5 (or 4,7)-dichloro-6-methylquinoline,
2-methyl-3-oxy-4,5 (or 4,7)-dibromo-6-methoxyquinoline, and
2-methyl-3-oxy-4,5 (or 4,7)-dichloro-6-methoxyquinoline,
2-methyl-3-oxy-4-carboxyl-6-methylquinoline,
2-methyl-3-oxy-4-carboxyl-6-methoxyquinoline.

Suitable halogenated naphthalene-2,3-dicarboxylic acids used for this reaction include:

mono-halogen-naphthalene-2,3-dicarboxylic acid,
di-halogen-naphthalene-2,3-dicarboxylic acid,
tri-halogen-naphthalene-2,3-dicarboxylic acid, and
tetra-halogen-naphthalene-2,3-dicarboxylic acid; and more particularly,
mono-bromo-naphthalene-2,3-dicarboxylic acid,
mono-chloro-naphthalene-2,3-dicarboxylic acid,
tetra-bromo-naphthalene-2,3-dicarboxylic acid, and
tetra-chloro-naphthalene-2,3-dicarboxylic acid.

The reaction of this invention can be conducted without a solvent, although an inert organic solvent may be used. Suitable inert organic solvents include o-dichlorobenzene, trichlorobenzene, o-nitrotoluene, nitrobenzene, chloronaphthalene, and tetrahydronaphthalene. When a solvent is used, it may be present in amounts of 5–20 times by weight based on the quinoline derivative (II).

The halogenated naphthalene-2,3-dicarboxylic acid, anhydride, or imide derivative thereof, may be used in amounts of 2–20 moles per mole of the quinoline derivative. However, it is preferable to use an excess quantity of halogenated naphthalene-2,3-dicarboxylic acid, anhydride or the imide, to react in a melt condition. The reaction temperature is preferably in the range of 120–300° C. and especially 150–260° C. It is possible to effect the reaction in the presence of a zinc chloride, aluminum chloride, etc. catalyst.

Following said reaction, the mixture is cooled, washed with methanol, ethanol, etc. Alternatively, the cooled mixture can be diluted with methanol, or ethanol, and the precipitated cake filtered and washed.

In one embodiment of this invention, the quinophthalene pigment is halogenated using a conventional halogenating agent in water or an approximate inert solvent. Suitable such solvents include chlorobenzene, o-nitrotoluene, nitrobenzene and trichlorobenzene or such inorganic acid or organic acids as sulfuric acid or acetic acid. The solvent may be used in amounts of 3–20 times the quantity of reaction mixture cake.

When the condensation reaction is conducted in an inert organic solvent, which is inert to halogenation and to condensation, the halogenation reaction can be conducted after the condensation reaction, without separation of the cake. Suitable halogenating agents include the halogens such as chlorine or bromine, and the halogenosulfites, such as thionylchloride or sulfurylchloride. It is especially preferable to use chlorine or bromine as the halogen. The reaction temperature for the halogenation reaction is preferably in the range of 40–180° C., and especially 70–160° C. It is advantageous to effect reaction in the presence of a halogenation catalyst, such as iodine, iron or ferric chloride.

The pigment can be conditioned by conventional techniques. For instance, it may be dissolved in a solvent such as sulfuric acid, caprylic acid, etc., reprecipitated in a large amount of ice water, and then filtered and washed with caustic alkali solution.

The resulting quinophthalone pigments are novel compounds and have excellent light fastness, excellent heat resistance, excellent oil resistance, excellent chemical resistance, and clear yellow tone color which render these compounds quite effective as pigments for paints, printing inks and plastics.

These pigments can be used in various articles, such as films, plates, etc., which are made of synthetic polymers, such as polyolefins, polystyrenes, polyacrylonitriles, polyvinylchlorides, polyamides, polycarbonates, and polyacetate type polymers. It is also possible to use them in various articles made of copolymers such as acrylic-styrene type copolymers and acrylic-butadiene-styrene type copolymers.

In order to impart color to the synthetic polymers using these pigments, it is possible to use conventional shaping procedures, such as press-molding, injection-molding, calendering, extrusion-molding, by using a mixture prepared by admixing and kneading a suitable amount of the pigment with the resin, or the like.

It is also possible to prepare a colored article having excellent fastness by conventional casting techniques whereby the pigment is admixed with a liquid monomer or a prepolymer and the mixture is cured by polymerization.

Having generally described the invention, a further understanding can be obtained by reference to certain specific Examples which are provided herein for purposes of illustration only and are not intended to be limiting in any manner. In the Examples, the term of part means part by weight.

EXAMPLE 1

10 parts of 2-methyl-3-oxyquinoline-4-carboxylic acid was dissolved in 100 parts of trichlorobenzene, and 80 parts of tetrabromonaphthalene-2,3-dicarboxylic anhydride was added dropwise to the mixture. The mixture was heated to 200° C. and was reacted at 200° C. for 9 hours. After cooling to 60° C., the precipitated crystals were filtered and washed with chlorobenzene and then washed with isopropyl alcohol to remove trichlorobenzene. The product was further washed with water and dried to yield 28 parts of the product having the following formula:

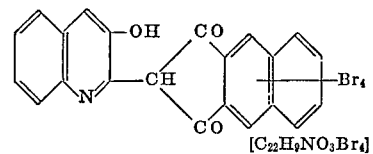

$[C_{22}H_9NO_3Br_4]$

According to the analysis of the resulting compound, the melting point of the product was 360° C. and the maximum absorption wave length of the product in acetone was 461 m$\mu$. It is possible to use the product itself as a pigment. However, higher quality quinophthalone pigment was prepared by dissolving the product in sulfuric acid and putting the solution in ice water to effect reprecipitation. The precipitate was then filtered by aspiration and washed with a caustic soda solution and subjected to a conventional conditioning treatment.

The resulting pigment had high tinting strength and excellent heat resistance, good light fastness, good chemical resistance and is quite effective for coloring paints, printing inks and plastics.

The result of elementary analysis was substantially the same as theoretical value, as shown in Table I.

TABLE I

| | Percent | | | |
| --- | --- | --- | --- | --- |
| | C | N | H | Br |
| Analytical value | 40.8 | 1.9 | 1.6 | 48.3 |
| Theoretical value | 40.3 | 2.1 | 1.4 | 48.9 |

EXAMPLE 2

10 parts of the cake obtained in Example 1 was added to 100 parts of o-dichlorobenzene, and the mixture was uniformly stirred and heated to 160° C., and then 9.1 parts of bromine was added dropwise over a period of about 1 hour.

After the titration, the mixture was reacted at 160° C. for 2 hours.

After the reaction, the product was cooled to room temperature and was filtered by suction and washed with methanol, acetone and water, respectively, in that order, and then dried to yield 11 parts of product having the following formula:

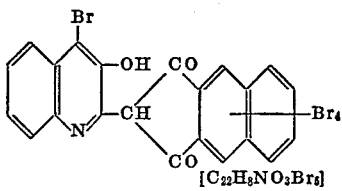

$[C_{22}H_8NO_3Br_5]$

The melting point of the product was higher than 360° C. and the maximum absorption wave length of the product in acetone was 476 m$\mu$.

The result of elementary analysis was substantially the same as the theoretical value, as shown in Table II.

TABLE II

| | Percent | | | |
|---|---|---|---|---|
| | C | N | H | Br |
| Analytical value | 36.5 | 2.2 | 1.0 | 53.8 |
| Theoretical value | 36.0 | 1.9 | 1.1 | 54.5 |

After applying a conditioning treatment, the pigment was admixed with a paint and a plastic to obtain a paint and a plastic having clear yellow tone colors and having excellent heat resistance, good light fastness, good chemical resistance and good high tinting strength.

EXAMPLE 3

90 parts of chloronaphthalene, 10 parts of 2-methyl-3-oxy-4-bromoquinoline, 35 parts of monochloronaphthalene-2,3-dicarboxylic imide and 2 parts of zinc chloride were mixed and heated to 175–180° C. and were reacted for 12 hours. After the reaction, the reaction product was gradually cooled to 60° C. and then was diluted with 100 parts of isopropyl alcohol. After cooling to room temperature, the product was filtered and washed with isopropyl alcohol and then washed with water.

The resulting wet cake was dispersed in 120 parts of 0.2% hydrochloric acid and was heat-treated at 70–80° C. and was filtered at the same temperature. The precipitate was then washed with water until the filtrate became neutral, and then was dried to yield 14 parts of the product having the following formula:

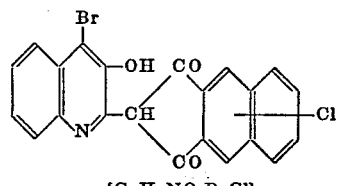

$[C_{22}H_{11}NO_3BrCl]$

The melting point of the product was higher than 360° C. and the maximum absorption wave length of the product in acetone was 463 m$\mu$.

The result of elementary analysis of the product was substantially the same as the theoretical value as shown in Table III.

The conditioning treatment of Example 1 was repeated by using the resulting product. As a result, a fine powdery yellow pigment having a more clear tone color was obtained. The pigment provided clear yellow tones having high tinting strengths and was especially suitable to use in preparing printing inks.

TABLE III

| | Percent | | | | |
|---|---|---|---|---|---|
| | C | H | N | Br | Cl |
| Analytical value | 58.0 | 2.2 | 3.3 | 17.9 | 7.6 |
| Theoretical value | 58.3 | 2.4 | 3.1 | 17.7 | 7.9 |

EXAMPLE 4

11 parts of 2-methyl-3-oxyquinoline-4-carboxylic acid was added to 150 parts of o-dichlorobenzene, and then 140 parts of dibromonaphthalene-2,3-dicarboxylic anhydried was added dropwise to the mixture while uniformly stirring.

The mixture was reacted for 12–13 hours under refluxing at the boiling point of o-dichlorobenzene (B.P. 179.2° C.). After the reaction, the reaction mixture was cooled to room temperature and was filtered and washed with methanol and then washed with water, and was dried to yield 15 parts of a product having the following formula:

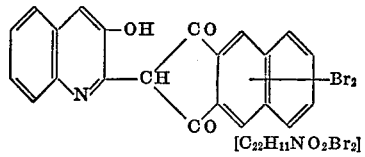

$[C_{22}H_{11}NO_2Br_2]$

The melting point of the product was higher than 360° C. and the maximum absorption wave length of the product in acetone was 465 m$\mu$.

The result of elementary analysis of the product was substantially the same as the theoretical value, as shown in Table IV.

TABLE IV

| | Percent | | | |
|---|---|---|---|---|
| | C | H | O | Br |
| Analytical value | 52.9 | 2.1 | 2.7 | 32.4 |
| Theoretical value | 53.1 | 5.2 | 2.8 | 32.6 |

The conditioning treatment of Example 1 was repeated by using the resulting product. As a result, a fine powdery yellow pigment having a more clear tone color and high tinting strength was obtained. The pigment provided clear yellow tones having high tinting strength and excellent light fastness, good heat resistance, and good oil resistance, and was especially suitable for use in plastics such as polyvinylchloride, melamine resin, phenol resin, polyethylene and styrene resin.

EXAMPLE 5

15 parts of 2-methyl-3-oxyquinoline was dissolved in 100 parts of nitrobenzene and 25 parts of naphthalene-2,3-dicarboxylic anhydride was added dropwise to the mixture. The mixture was reacted for 15–16 hours under refluxing at the boiling point of nitrobenzene. After the reaction, the reaction product was cooled to 40° C. and filtered.

The resulting cake was washed with 80 parts of methanol and then washed with water and was dried to yield 17 parts of the product having the formula:

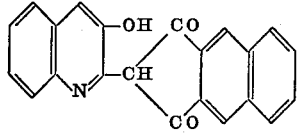

The product was crushed into a fine powder, and was dispersed in 200 parts of water. 0.5 part of iodine was added to the dispersion and was heated to 90–95° C. 35 parts of bromine was added dropwise to the mixture over a period of 2 hours while uniformly stirring, and then was reacted for 3 hours. After the reaction, the reaction product was cooled to room temperature and was filtered and washed with methanol and then washed with water. The product was dried and recrystallized from chlorobenzene to yield 21 parts of product having the following formula in which 3 Br atoms were introduced:

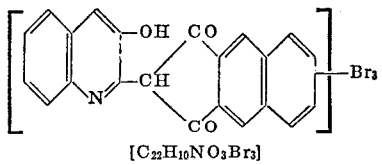

[C$_{22}$H$_{10}$NO$_3$Br$_3$]

The melting point of the product was higher than 360° C. and the maximum absorption wave length of the product was 468 mμ.

The conditioning treatment of Example 1 was repeated by using the product. As a result, a fine powdery yellow pigment having more clear tone and excellent heat resistance, light fastness and chemical resistance and high tinting strength was obtained.

TABLE V

|  | Percent | | | |
| --- | --- | --- | --- | --- |
|  | C | H | N | Br |
| Analytical value | 46.1 | 1.6 | 2.1 | 41.2 |
| Theoretical value | 45.8 | 1.8 | 2.4 | 41.7 |

EXAMPLE 6

20 parts of 2-methyl-3-oxyquinoline was dissolved in 150 parts of trichlorobenzene, and then 45 parts of tetrachloronaphthalene-2,3-dicarboxylic acid was added to the mixture while uniformly stirring, and then the mixture was reacted at 180–185° C. for 7–8 hours. After the reaction, the mixture was cooled to 150° C. and 7.3 parts of bromine was added dropwise over a period of about 1 hour.

After the addition, the mixture was reacted for 1.5 hours at the same temperature and then the reaction product was cooled to 50° C. and was filtered at the same temperature and washed with methanol, and then washed with water and dried to yield 42 parts of the product having the following formula:

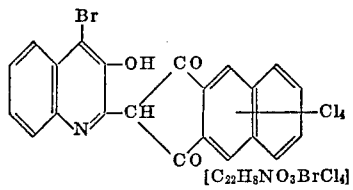

[C$_{22}$H$_8$NO$_3$BrCl$_4$]

The maximum absorption wave length of the product in acetone was 471 mμ. The result of elementary analysis of the product was substantially the same as the theoretical value, as stated in Table VI.

TABLE VI

|  | Percent | | | | |
| --- | --- | --- | --- | --- | --- |
|  | C | H | N | Br | Cl |
| Analytical value | 47.1 | 1.6 | 2.4 | 14.7 | 25.5 |
| Theoretical value | 47.5 | 1.4 | 2.5 | 14.4 | 25.5 |

The conditioning treatment of Example 1 was repeated by using the product. As a result, a fine powdery pigment having clear yellow tones and excellent light fastness, good heat resistance, god oil resistance and high tinting strength was obtained.

EXAMPLE 7

10 parts of 2-methyl-3-oxy-4-carboxy-6-methylquinoline was reacted with 80 parts of tetrabromonaphthalene-2,3-dicarboxylic acid anhydride in accordance with the process of Example 1. As the result, a product having the following formula was obtained:

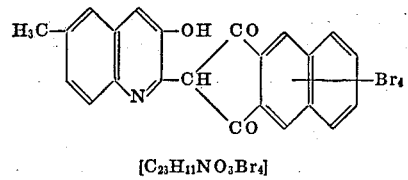

[C$_{23}$H$_{11}$NO$_3$Br$_4$]

The melting point of the product was higher than 330°C. and the product was insoluble in acetone. The result of elementary analysis of the product is shown in Table VII.

TABLE VII

|  | Percent | | | |
| --- | --- | --- | --- | --- |
|  | C | N | H | Br |
| Analytical value | 41.9 | 1.9 | 1.7 | 48.0 |
| Theoretical value | 41.2 | 2.1 | 1.6 | 47.9 |

After applying a conventional conditioning treatment to the product, a pigment having excellent heat resistance, good light fastness and good chemical resistance was obtained, and the pigment provided clear yellow tones having high tinting strength to the plastics.

EXAMPLE 8

10 parts of 2-methyl-3-oxy-4-carboxy-6-methylquinoline was reacted with 80 parts of tetrabromonaphthalene-2,3-dicarboxylic anhydride in accordance with the process of Example 1. As the result, a product having the following formula was obtained:

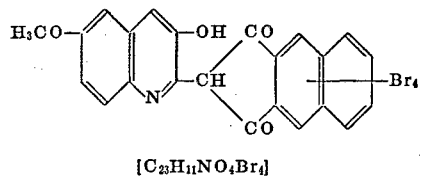

[C$_{23}$H$_{11}$NO$_4$Br$_4$]

The melting point of the product was higher than 330°C. and the product was insoluble in acetone. The result of elementary analysis of the product is shown in Table VIII.

TABLE VIII

|  | Percent | | | |
| --- | --- | --- | --- | --- |
|  | C | N | H | Br |
| Analytical value | 40.6 | 1.9 | 1.7 | 47.0 |
| Theoretical value | 40.3 | 2.0 | 1.6 | 46.7 |

After applying the conditioning to the product, a pigment having excellent heat resistance, good light fastness and good chemical resistance was obtained and the pigment provided clear yellow tones having high tinting strength to the plastics.

Having now fully described the invention, it will be apparent to one of ordinary skill in the art that many changes and modifications can be made thereto without departing from the spirit or scope of the invention.

Accordingly, what is claimed and intended to be covered by Letters Patent is:

1. A pigment having the formula:

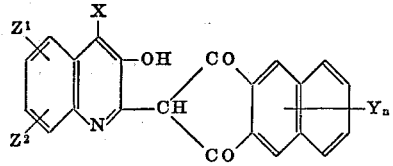

wherein

X is hydrogen or bromine or chlorine
Y is bromine or chlorine
$Z^1$ is hydrogen, bromine, chlorine, lower alkyl or lower alkoxy
$Z^2$ is hydrogen or bromine or chlorine, and
$n$ is an integer of 1-4.

2. The pigment of claim 1, wherein X is hydrogen and Y is Br.
3. The pigment of claim 1, wherein X is Br and Y is Br.
4. The pigment of claim 1, wherein X is Br and Y is Cl.

References Cited

UNITED STATES PATENTS 3,766,190  10/1973  Spigtschka et al. __ 260—289 QP

FOREIGN PATENTS 204,255   4/1907  Austria _____ 260—289 QP
1,403,435 6/1965  France _____ 260—289 QP DONALD G. DAUS, Primary Examiner U.S. Cl. X.R.

106—288 Q; 260—37 R, 287 R, 289 R, 515 A, 694